(12) United States Patent
Li et al.

(10) Patent No.: US 9,529,226 B2
(45) Date of Patent: Dec. 27, 2016

(54) DISPLAY APPARATUS

(71) Applicant: BOE TECHNOLOGY GROUP CO., LTD., Beijing (CN)

(72) Inventors: Wenbo Li, Beijing (CN); Yefei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 14/548,653

(22) Filed: Nov. 20, 2014

(65) Prior Publication Data

US 2016/0011459 A1   Jan. 14, 2016

(30) Foreign Application Priority Data

Jul. 10, 2014   (CN) .......................... 2014 1 0327956

(51) Int. Cl.
*G02F 1/1335* (2006.01)
*G02B 5/30* (2006.01)

(52) U.S. Cl.
CPC ....... *G02F 1/133528* (2013.01); *G02B 5/3025* (2013.01); *G02F 2001/133531* (2013.01)

(58) Field of Classification Search
CPC .............. G02F 1/133528; G02F 2001/133531; G02B 5/3025; H01L 27/32; H01L 51/5281; H01J 5/16
USPC ........................................................ 349/199
See application file for complete search history.

(56) References Cited

U.S. PATENT DOCUMENTS

| | | | | |
|---|---|---|---|---|
| 4,767,190 A | * | 8/1988 | Dir ...................... | G02F 1/13363 349/102 |
| 5,414,541 A | * | 5/1995 | Patel .................. | G02F 1/13471 349/133 |
| 7,705,937 B2 | * | 4/2010 | Sakamoto ......... | G02F 1/133555 349/103 |
| 2002/0008811 A1 | * | 1/2002 | Liao .................. | G02F 1/133528 349/96 |
| 2003/0227450 A1 | * | 12/2003 | Satoh ..................... | G02B 27/26 345/204 |
| 2005/0088740 A1 | * | 4/2005 | Takeda ................. | G02B 5/3016 359/485.01 |
| 2007/0263140 A1 | * | 11/2007 | Hinata .............. | G02F 1/133308 349/96 |

(Continued)

FOREIGN PATENT DOCUMENTS

| | | |
|---|---|---|
| CN | 1338713 A | 3/2002 |
| CN | 201926835 U | 8/2011 |

(Continued)

OTHER PUBLICATIONS

First Chinese Office Action dated Apr. 28, 2016, for corresponding Chinese Application No. 201410327956.2.

*Primary Examiner* — Hoan C Nguyen
(74) *Attorney, Agent, or Firm* — Kinney & Lange, P.A.

(57) ABSTRACT

An embodiment of the present invention discloses a display apparatus comprising: a display panel having a first side and a second side in opposite to the first side; a first polarizer arranged on the first side of the display panel; and a second polarizer arranged on either of the first side and the second side of the display panel, wherein an angle between a direction of a light transmission axis of the second polarizer and a direction of a light transmission axis of the first polarizer is adjustable.

16 Claims, 2 Drawing Sheets

(56) References Cited

U.S. PATENT DOCUMENTS

2009/0109351 A1\* 4/2009 Shiomi ................ G02F 1/1347
348/790

FOREIGN PATENT DOCUMENTS

| CN | 102890344 A | 1/2013 |
|----|-------------|--------|
| CN | 1038383028 A | 6/2014 |
| JP | H09257641 A | 10/1997 |
| JP | 2009229756 A | 10/2009 |

\* cited by examiner

DISPLAY APPARATUS

CROSS-REFERENCE TO RELATED APPLICATION

This application claims the benefit of Chinese Patent Application No. 201410327956.2 filed on Jul. 10, 2014 in the State Intellectual Property Office of China, the whole disclosure of which is incorporated herein by reference.

BACKGROUND OF THE INVENTION

Field of the Invention

The present disclosure relates to the technical field of display, in particular, relates to a display apparatus.

Description of the Related Art

With the development of the science and technology, entertainment becomes more and more plentiful. The conventional entertainment may include, for example, viewing an image and a video, playing a game and so on.

In the prior art, a display apparatus provided for the people to view an image and a video and to play a game, such as TV, a computer, or a video game console only shows an intuitive picture which has nonadjustable brightness, colors and contrast.

SUMMARY OF THE INVENTION

An embodiment of the present invention provides a display apparatus comprising:

a display panel having a first side and a second side in opposite to the first side;

a first polarizer arranged on the first side of the display panel; and a second polarizer arranged on either of the first side and the second side of the display panel, wherein an angle between a direction of a light transmission axis of the second polarizer and a direction of a light transmission axis of the first polarizer is adjustable.

BRIEF DESCRIPTION OF THE DRAWINGS

The above and other features of the present invention will become more apparent by describing in detail exemplary embodiments thereof with reference to the accompanying drawings by way of examples. Throughout the drawings, same reference numerals represent same or similar members.

DETAILED DESCRIPTION OF PREFERRED EMBODIMENTS OF THE INVENTION

Figure 1:
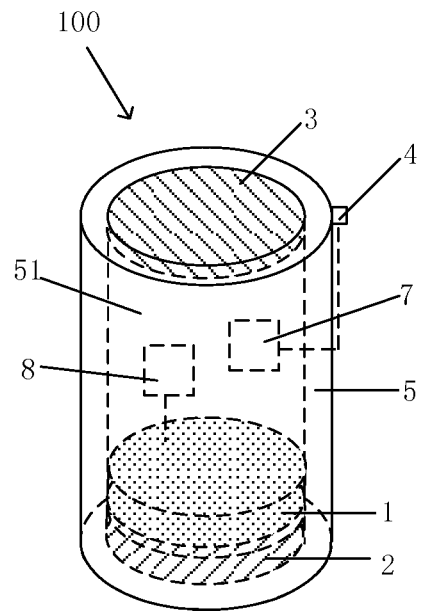
FIG. 1 is a perspective schematic view showing a display apparatus according to an embodiment of the present invention.

The embodiments of the present invention will be further explained below with reference to the figures and examples. It should be noted that same or similar reference numerals represent same or similar members or those having same or similar functions. The following embodiments are only explained by way of examples, instead of being intended to limit the scope of the present invention.

In accordance with a general invention concept of the present disclosure, a display apparatus is provided, comprising: a display panel having a first side and a second side in opposite to the first side; a first polarizer arranged on the first side of the display panel; and a second polarizer arranged on either of the first side and the second side of the display panel, wherein an angle between a direction of a light transmission axis of the second polarizer and a direction of a light transmission axis of the first polarizer is adjustable.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The embodiment of the present invention provides a display apparatus. The display apparatus shows a picture which has adjustable brightness, colors and/or contrast.

As an example, as illustrated in FIG. 1, the display apparatus 100 includes a display panel 1, a first polarizer 2 and a second polarizer 3. The display panel 1 has a first side and a second side in opposite to the first side. The first polarizer 2 is arranged on the first side of the display panel 1. The second polarizer 3 is arranged on either of the first side and the second side of the display panel 1. An angle between a direction of a light transmission axis of the second polarizer 3 and a direction of a light transmission axis of the first polarizer 2 is adjustable. The brightness, colors and/or contrast of the picture shown on the display apparatus may be changed, for example, on the basis of the visual requirements of viewing an image, a video or playing a game, by adjusting the angle between the direction of a light transmission axis of the second polarizer 3 and the direction of a light transmission axis of the first polarizer 2, such that the picture shown on the display apparatus becomes more entertaining, thereby improving the experiences of users in the entertainment in which the display apparatus is applied.

It should be noted that the entertainment in which the display apparatus is applied may include viewing an image and a video, playing a game and so on, which are not limited in the embodiments of the present invention.

In an embodiment, the first polarizer 2 overlaps partially with the second polarizer 3 in a direction perpendicular to a surface of the display panel 1. It may facilitate the first polarizer 2 and the second polarizer 3 to cover a common area of the display panel 1 so as to facilitate adjustment of the brightness, colors and/or contrast.

With reference to the case that the display panel 1 is a liquid crystal display panel, it is described in detail now how the brightness, colors and/or contrast of the picture shown on the display apparatus 100 may be changed by adjusting the angle between the direction of a light transmission axis of the second polarizer 3 and the direction of a light transmission axis of the first polarizer 2, such that the picture shown on the display apparatus becomes more entertaining, thereby improving the experiences of users in the entertainment in which the display apparatus is applied.

Figure 2:
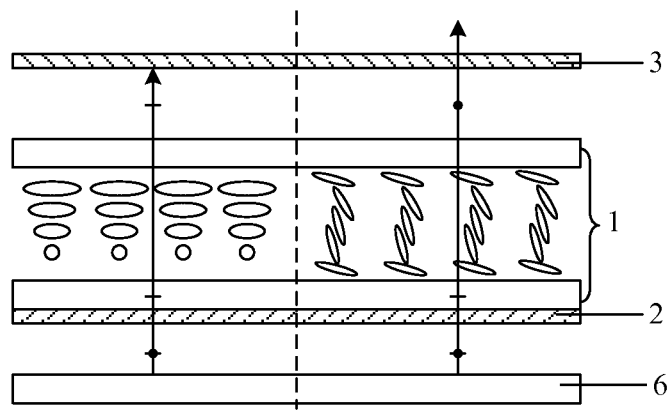
FIG. 2 is a schematic view in cross section showing a display apparatus according to an embodiment of the present invention.
Figure 3:
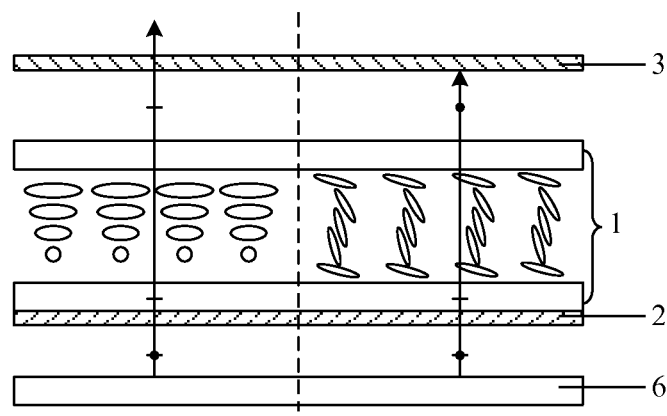
FIG. 3 is a schematic view in cross section showing a display apparatus according to an embodiment of the present invention.

As an example, as illustrated in FIGS. 2-3, a first pixel unit in which liquid crystal molecules are not deflected is shown on the left side of the dash while a second pixel unit in which liquid crystal molecules have been deflected by 90 degrees is shown on the right side of the dash.

At first, in FIG. 3, the angle between the direction of a light transmission axis of the second polarizer 3 and the direction of a light transmission axis of the first polarizer 2 is 0 degree. In this way, a light emitted from a backlight unit 6 is transmitted through a first polarizer 2 to form a polarized light and the polarization of the polarized light will not be changed upon passing through the first pixel unit since the liquid crystal molecules in the first pixel unit are not deflected. Thus, the polarized light may be transmitted through the second polarizer 3 such that there is a light emitted from an area in which the first pixel unit is located. In contrast, when the polarized light is transmitted through the second pixel unit, its polarization is changed since the liquid crystal molecules have been deflected by 90 degrees in the second pixel unit. Thus, the polarized light cannot be emitted from the second polarizer 3 such that there is no light emitted from an area in which the second pixel unit is located.

Alternatively, in FIG. 2, the second polarizer 3 has been rotated by 90 degrees with respect to the case shown in FIG. 3. Thus, the angle between the direction of a light transmission axis of the second polarizer 3 and the direction of a light transmission axis of the first polarizer 2 is 90 degrees. In this way, a light emitted from a backlight unit 6 is transmitted through the first polarizer 2 to form a polarized light and the polarization of the polarized light will not be changed upon passing through the first pixel unit since the liquid crystal molecules in the first pixel unit are not deflected. Thus, the polarized light cannot be transmitted through the second polarizer 3 such that there is no light emitted from an area in which the first pixel unit is located. In contrast, when the polarized light is transmitted through the second pixel unit, its polarization is changed since the liquid crystal molecules have been deflected by 90 degrees in the second pixel unit. Thus, the polarized light may be emitted from the second polarizer 3 such that there is a light emitted from an area in which the second pixel unit is located. Thereby, brightness, colors and the like of the picture shown on the area in which the first pixel unit is located and the area in which the second pixel unit is located are changed.

With reference to the above examples, when the liquid crystal display panel includes a plurality of pixel units, the angle between the direction of a light transmission axis of the second polarizer 3 and the direction of a light transmission axis of the first polarizer 2 will be changed such that the intensity of the light emitted from the areas in which all of the pixel units are located are changed so as to change the brightness and colors of all of display pixels. In this way, the picture shown on the display apparatus becomes more entertaining, thereby improving the experiences of users in the entertainment in which the display apparatus is applied.

It should be noted that the example is described in the above paragraphs only with reference to the case that the angle between the direction of the light transmission axis of the second polarizer 3 and the direction of the light transmission axis of the first polarizer 2 becomes 90 degrees from 0 degree, however, the embodiments of the present invention are not limited to this. When the angle between the direction of the light transmission axis of the second polarizer 3 and the direction of the light transmission axis of the first polarizer 2 is changed by any angles, the colors, contrast and brightness of the picture shown on the display apparatus may be changed correspondingly. In addition, the skilled person in the art would appreciate that when the display panel 1 is an organic light emitting diode display panel, a plasma display panel or a cathode ray tube display panel, the brightness, colors and/or contrast of the picture shown on the display apparatus 100 may also be changed by adjusting the angle between the direction of the light transmission axis of the second polarizer 3 and the direction of the light transmission axis of the first polarizer 2, such that the picture shown on the display apparatus becomes more entertaining, thereby improving the experiences of users in the entertainment in which the display apparatus is applied.

An embodiment of the present invention provides a display apparatus 100 including: a display panel 1 having a first side and a second side in opposite to the first side; a first polarizer 2 arranged on the first side of the display panel 1; and a second polarizer 3 arranged on either of the first side and the second side of the display panel 1. An angle between a direction of a light transmission axis of the second polarizer 3 and a direction of a light transmission axis of the first polarizer 2 is adjustable. The brightness, colors and/or contrast of the picture shown on the display apparatus may be changed, for example, on the basis of the visual requirements of viewing an image, a video or playing a game, by adjusting the angle between the direction of a light transmission axis of the second polarizer 3 and the direction of a light transmission axis of the first polarizer 2, such that the picture shown on the display apparatus becomes more entertaining, thereby improving the experiences of users in the entertainment in which the display apparatus is applied.

As an example, the first polarizer 2 may be fixed on the first side of the display panel 1 and the angle between the direction of the light transmission axis of the second polarizer 3 and the direction of the light transmission axis of the first polarizer 2 is adjusted by rotation of the second polarizer 3. In this way, the brightness, colors and/or contrast of the picture shown on the display apparatus may be changed.

It should be noted that the embodiments of the present invention are not intended to limit the shapes of the first polarizer 2, the display panel 1 and the second polarizer 3. In an example, as illustrated in FIG. 1, the second polarizer 3 may have a shape of substantially circle, for convenience of rotation of the second polarizer 3. As an example, the second polarizer 3 may have a rotation angle of 0-360 degrees. As an example, the shape of the display panel 1 may be a regular or an irregular form, such as a circle, a rectangle or a hexagon.

As an example, as illustrated in FIG. 1, the display apparatus 100 may further include a rotation adjusting member 4 configured to adjust the rotation angle of the second polarizer 3. In an example, the rotation adjusting member 4 may be a handle connected to the second polarizer 3. An observer may hold the handle to rotate the second polarizer 3. Alternatively, the rotation adjusting member 4 may also be a knob, which may be rotated by the observer to rotate the second polarizer 3.

Figure 4:
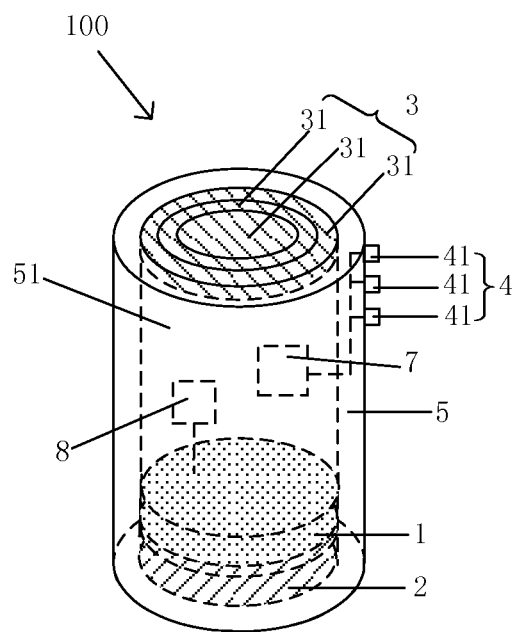
FIG. 4 is a perspective schematic view showing a display apparatus according to an embodiment of the present invention.

As an example, in order to allow the brightness, colors and contrast of the picture shown on the display apparatus to be varied more variously, as illustrated in FIG. 4, the second polarizer 3 may include at least two rotating parts 31 which are rotatable independently. At least two or more of the rotating parts 31 may be located in the same plane and joined to each other, or at least two or more of the rotating parts 31 may be at least partially overlapped with each other. As an example, the second polarizer 3 may include a circular rotating part 31 centered in the second polarizer 3 and two annular rotating parts 31 and the three rotating parts 31 are joined to each other. Or, the second polarizer 3 may be formed by superposing a plurality of concentric circles having different areas with each other, where the concentric circle having a larger area is located in the lower layer. For the display apparatus including the second polarizer 3 with such structure, for example, the picture shown on the display apparatus may have desired brightness, colors and contrast by adjusting the rotation angles of the respective concentric circles at the center.

As an example, as shown in FIG. 4, if the second polarizer 3 includes at least two rotating parts 31, the rotation adjusting member 4 comprised in the display apparatus 100 may include at least two adjusting parts 41, each of the adjusting parts 41 being configured to adjust a rotation angle of each of the rotation parts 31.

As an example, the display apparatus 100 may further comprise a rotation control module 7 configured to control the rotation adjusting member 4.

As an example, as shown in FIG. 1 and FIG. 4, the display apparatus 100 may further include an outer frame 5, for example a cylindrical outer frame. The outer frame 5 may be configured to connect the second polarizer 3 to the display panel 1 mounted with the first polarizer 2. The outer frame 5 may have a cavity 51. For example, the rotation adjusting module 7 may be located within the cavity 51 to reduce the volume of the display apparatus 100. As an example, the display apparatus may further include a display panel driving module 8 configured to drive the display panel 1. The display panel driving module 8 may also be located within the cavity 51 of the outer frame 5 to reduce the volume of the display apparatus 100. In an example, the outer frame 5 is retractable to adjust the distance between the display panel 1 mounted with the first polarizer 2 and the second polarizer 3 so as to improve the visual experiences of the user.

It should be noted that, although FIGS. 1 and 4 show the rotation adjusting module 7 and the display panel driving module 8 are located in the cavity 51 of the outer frame 5, the embodiments of the present invention are not limited to this. Alternatively, the rotation adjusting module 7 and the display panel driving module 8 may be located at any other positions, for example, in the wall of the outer frame 5 or outside of the outer frame 5.

It should be noted that the structure of the display apparatus 100 is not limited to this, and the second polarizer 3 may also be separated from the display panel 1 mounted with the first polarizer 2. For example, the second polarizer 3 may be used as a lens of glasses and the rotation adjusting member 4 may be located on the lens. When the display panel 1 is a liquid crystal display panel, if the observer does not wear the glasses in which the second polarizer 3 is used as the lens, the observer will only see a blank; otherwise, if the observer wears the glasses in which the second polarizer 3 is used as the lens, the observer will see the picture shown on the display apparatus. In the latter case, the brightness, colors and/or contrast of the picture may be adjusted to make the picture shown on the display apparatus more entertaining, thereby improving the experiences of users in the entertainment in which the display apparatus is applied. In addition, the display apparatus with such structure may have a privacy function.

As an example, the angle between the direction of the light transmission axis of the second polarizer 3 and the direction of the light transmission axis of the first polarizer 2 may be adjustable for example between 0 and 90 degrees.

As an example, the display panel 1 of the display apparatus 100 may be a liquid crystal display panel, an organic light emitting diode display panel, a plasma display panel or a cathode ray tube display panel, and so on.

Figure 5:
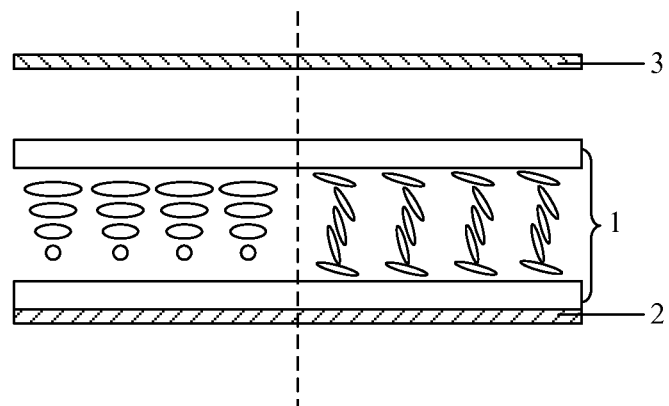
FIG. 5 is a schematic view in cross section showing a display apparatus according to an embodiment of the present invention.

In an example, if the display panel 1 is a liquid crystal display panel, as illustrated in FIGS. 2, 3 and 5, the first polarizer 2 and the second polarizer 3 are located on both sides of the display panel 1 respectively. At that time, the display apparatus 100 may include a backlight unit 6, or may not include it. For example, as illustrated in FIG. 5, when the display apparatus does not include the backlight unit 6, the first polarizer 2 may receive the light provided by an external environment of the display apparatus. The light may allow the observer to see the picture of the external true world through the display panel. Thus, the observer may both see the picture shown on the display apparatus 100 and the picture of the external true world. In this way, the observer has more plentiful visual experiences. Alternatively, if the display apparatus 100 includes the backlight unit 6, as illustrated in FIGS. 2-3, the backlight unit 6 is located on the side of the first polarizer 2 away from the display panel 1, i.e., the second side of the display panel 1. Since the light emitted from the backlight unit 6 may be transmitted through the first polarizer 2, the display panel 1 and the second polarizer 3 in sequence, the display apparatus 100 may be used as a torch in dark environment. The second polarizer 3 may be rotated to adjust the intensity of the light emitted from the display apparatus 100. In this case, when the picture shown on the display apparatus 100 is a blank, the display apparatus 100 has the best illumination effect.

Figure 6:
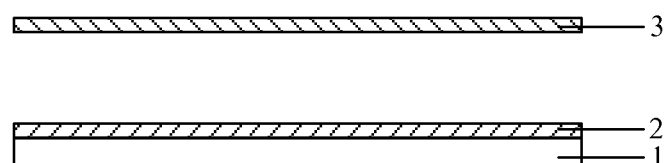
FIG. 6 is a schematic view in cross section showing a display apparatus according to an embodiment of the present invention.

As an example, if the display panel 1 is an organic light emitting diode display panel, a plasma display panel or a cathode ray tube display panel and so on, as illustrated in FIG. 6, the first polarizer 2 and the second polarizer 3 are located on one side of the display panel 1 in sequence. At that time, the first polarizer 2 converts a natural light emitted from the display panel 1 such as the organic light emitting diode display panel, the plasma display panel or the cathode ray tube display panel in display process into a polarized light. The brightness, colors and/or contrast of the picture shown on the display apparatus may be changed by adjusting the angle between the direction of a light transmission axis of the second polarizer 3 and the direction of a light transmission axis of the first polarizer 2, such that the picture shown on the display apparatus becomes more entertaining, thereby improving the experiences of users in the entertainment in which the display apparatus is applied.

Although several exemplary embodiments have been shown and described, the present invention is not limited to those and it would be appreciated by those skilled in the art that various changes or modifications may be made in these embodiments without departing from the principles and spirit of the disclosure, which should fall within the scope of the present invention. The scope of the invention is defined by the claims and their equivalents.

What is claimed is:

1. A display apparatus comprising:
   a display panel having a first side and a second side opposite the first side;
   a first polarizer arranged on the first side of the display panel; and
   a second polarizer arranged on either the first side or the second side of the display panel,
   wherein an angle between a direction of a light transmission axis of the second polarizer and a direction of a light transmission axis of the first polarizer is adjustable;

wherein the first polarizer is fixed on the first side of the display panel, and wherein the angle between the direction of the light transmission axis of the second polarizer and the direction of the light transmission axis of the first polarizer is adjusted by rotation of the second polarizer, and the second polarizer comprises at least two rotating parts which are rotatable independently from each other, at least two of the rotating parts being located in the same plane and joined to each other, or at least two of the rotating parts being at least partially overlapped with each other, and wherein the display apparatus further comprises a rotation adjusting member which comprises at least two adjusting parts and a rotation control module configured to control the rotation adjusting member, each of the adjusting parts being configured to adjust a rotation angle of each of the rotating parts.

2. The display apparatus according to claim 1, wherein the first polarizer at least overlaps partially with the second polarizer in a direction perpendicular to a surface of the display panel.

3. The display apparatus according to claim 1, wherein the second polarizer has a rotation angle of 0~360 degrees.

4. The display apparatus according to claim 1, wherein the second polarizer has a substantially circular shape.

5. The display apparatus according to claim 1, further comprising a rotation adjusting member configured to adjust a rotation angle of the second polarizer.

6. The display apparatus according to claim 5, further comprising a rotation control module configured to control the rotation adjusting member.

7. The display apparatus according to claim 1, further comprising an outer frame configured to connect the second polarizer to the display panel mounted with the first polarizer, the outer frame having a cavity within which the rotation control module is located.

8. The display apparatus according to claim 7, wherein the outer frame is cylindrical.

9. The display apparatus according to claim 7, further comprising a display panel driving module configured to drive the display panel and located within the cavity of the outer frame.

10. The display apparatus according to claim 1, wherein the angle between the direction of the light transmission axis of the second polarizer and the direction of the light transmission axis of the first polarizer is adjustable between 0 and 90 degrees.

11. The display apparatus according to claim 1, wherein the second polarizer is separated from the display panel mounted with the first polarizer.

12. The display apparatus according to claim 1, wherein the second polarizer is located on the second side of the display panel.

13. The display apparatus according to claim 12, wherein the display panel is a liquid crystal display panel.

14. The display apparatus according to claim 12, further comprising a backlight unit located on the second side of the display panel.

15. The display apparatus according to claim 1, wherein the first polarizer and the second polarizer are located sequentially on the first side of the display panel.

16. The display apparatus according to claim 15, wherein the display panel is an organic light emitting diode display panel, a plasma display panel or a cathode ray tube display panel.

* * * * *